(12) United States Patent
Singleton (10) Patent No.: US 9,623,807 B2
(45) Date of Patent: Apr. 18, 2017

(54) CARRYING SYSTEM FOR SPORT UTILITY VEHICLE DOORS AND HARDTOP

(71) Applicant: Chris Singleton, Rogersville, TN (US)

(72) Inventor: Chris Singleton, Rogersville, TN (US)

( * ) Notice: Subject to any disclaimer, the term of this patent is extended or adjusted under 35 U.S.C. 154(b) by 0 days.

(21) Appl. No.: 15/249,892

(22) Filed: Aug. 29, 2016

(65) Prior Publication Data

US 2016/0362064 A1 Dec. 15, 2016

Related U.S. Application Data

(63) Continuation-in-part of application No. 14/679,553, filed on Apr. 6, 2015, now abandoned.

(60) Provisional application No. 61/975,419, filed on Apr. 4, 2014.

(51) Int. Cl.
| | | |
|---|---|---|
| *B60R 11/00* | (2006.01) |
| *B60R 19/02* | (2006.01) |
| *B60R 9/06* | (2006.01) |
| *B62D 43/02* | (2006.01) |
| *B60J 7/10* | (2006.01) |
| *B60J 7/20* | (2006.01) |

(52) U.S. Cl.
CPC .............. *B60R 9/06* (2013.01); *B60J 7/106* (2013.01); *B60J 7/201* (2013.01); *B62D 43/02* (2013.01)

(58) Field of Classification Search
CPC  B60R 11/00; B60R 19/02; B60R 9/10; B60R 9/06; B62D 43/02
USPC ............... 224/519, 523, 529, 525, 524, 530, 224/533–537, 511, 513, 517, 518
See application file for complete search history.

(56) References Cited

U.S. PATENT DOCUMENTS

| | | | | |
|---|---|---|---|---|
| 1,575,685 | A | * | 3/1926 | Herrmann .............. B62D 43/02 224/42.26 |
| 2,106,503 | A | * | 1/1938 | Hendrick ................. B60R 9/06 211/70.5 |
| 4,189,074 | A | * | 2/1980 | Davies ...................... B60R 9/12 211/70.5 |
| 4,410,117 | A | * | 10/1983 | Crawford .............. B62D 43/02 224/403 |
| 4,767,038 | A | * | 8/1988 | McVicar ................ B62D 43/02 224/42.12 |
| 4,997,116 | A | | 3/1991 | Grim |
| 5,029,740 | A | | 7/1991 | Cox |
| 5,370,285 | A | | 12/1994 | Steelman |
| 5,579,972 | A | | 12/1996 | Despain |
| 5,826,768 | A | * | 10/1998 | Gamulo ................... B60R 9/06 224/484 |
| 6,378,748 | B1 | | 4/2002 | Cox |
| 6,431,423 | B1 | | 8/2002 | Allen |

(Continued)

*Primary Examiner* — Brian D Nash
(74) *Attorney, Agent, or Firm* — Pitts & Lake, P.C.

(57) ABSTRACT

A carrying system for a SUV hardtop, which includes a carrier that allows the hardtop and doors to be detached from the vehicle but still kept with the vehicle while removed. The carrying system allows for easy attachment and securing of the hardtop and doors to the carrier. In some exemplary embodiments, the carrier attaches to the hitch and to the rear-mounted spare tire carrier of the SUV. In other exemplary embodiments, the carrier attaches to the vehicle only at the hitch. Conveying the doors and hardtop with the SUV allows the SUV, at any time and in any place, to be converted quickly between convertible and non-convertible modes, depending on weather conditions and other factors.

10 Claims, 6 Drawing Sheets

(56) References Cited

U.S. PATENT DOCUMENTS

| | | | | |
|---|---|---|---|---|
| 6,736,301 B1* | 5/2004 | Huang | | B60R 9/06 |
| | | | | 224/500 |
| 6,811,038 B1* | 11/2004 | Sanderson | | A47B 81/00 |
| | | | | 211/13.1 |
| 6,889,881 B2* | 5/2005 | Wilkens | | B60R 9/065 |
| | | | | 224/509 |
| 6,910,669 B2 | 6/2005 | Gates | | |
| 7,249,927 B2* | 7/2007 | Wooten | | B62D 43/02 |
| | | | | 224/42.12 |
| 7,275,670 B1* | 10/2007 | Shumack | | B60R 9/06 |
| | | | | 224/518 |
| 7,293,681 B2 | 11/2007 | Wills | | |
| 7,597,222 B2* | 10/2009 | Bishop | | B60R 9/06 |
| | | | | 224/42.21 |
| 7,788,858 B1* | 9/2010 | Ammons | | B66C 23/44 |
| | | | | 212/180 |
| 8,840,000 B1 | 9/2014 | Simpson | | |
| 2003/0173387 A1 | 9/2003 | Mitchell | | |
| 2005/0092800 A1* | 5/2005 | Wilson | | B60R 9/08 |
| | | | | 224/513 |
| 2005/0199671 A1* | 9/2005 | Riley | | B60R 9/06 |
| | | | | 224/512 |
| 2005/0258200 A1* | 11/2005 | Scola | | B62D 43/02 |
| | | | | 224/42.13 |
| 2006/0289578 A1* | 12/2006 | Beyes | | B60R 11/00 |
| | | | | 224/488 |
| 2007/0181624 A1* | 8/2007 | Smith | | B60R 9/06 |
| | | | | 224/519 |
| 2009/0189381 A1* | 7/2009 | Kirtland | | B60R 9/06 |
| | | | | 280/769 |
| 2013/0221042 A1 | 8/2013 | Fortner | | |
| 2014/0124547 A1 | 5/2014 | Simpson | | |

* cited by examiner

CARRYING SYSTEM FOR SPORT UTILITY VEHICLE DOORS AND HARDTOP

CROSS-REFERENCE TO RELATED APPLICATIONS

This application claims the benefit of U.S. Non-Provisional patent application Ser. No. 14/679,553 filed on Apr. 6, 2015, which, in turn, claimed the benefit of U.S. Provisional Patent Application Ser. No. 61/975,419, filed Apr. 4, 2014, the entirety of each of which is incorporated herein by reference.

STATEMENT REGARDING FEDERALLY SPONSORED RESEARCH OR DEVELOPMENT

Not Applicable

BACKGROUND OF THE INVENTION

1. Field of Invention

This invention pertains generally to portable carrying and storage systems for removable vehicle doors and hardtops and, more particularly, to a carrying system for carrying the removed doors and hardtop of a Sport Utility Vehicle, ("SUV"), such as, but not limited to, a Jeep® Wrangler, hardtops and doors.

2. Description of the Related Art

Often, the drivers of certain types of Sport Utility Vehicles (SUV) desire to ride in an open vehicle or to maximize the usable interior space of the vehicle. Often, this mode of operation requires removing of the doors and hardtop of the particular vehicle.

In the past, removed doors often were carried in the cargo space behind the rear seats, in the cabin in the rear seat compartment, or secured, in some manner, to the rear mounted spare tire of the vehicle. In the former instance, the concept of maximizing interior space is negated. The latter option can cause damage to the plastic door windows or warpage of the doors due to the uneven surface of the spare tire. Doors could be sometimes left behind, but this presented a problem if the doors were needed later to protect against severe weather conditions. A system for efficiently and safely mounting and transporting removable SUV doors on the rear of the vehicle would certainly be a welcome addition to the art.

U.S. Pat. No. 7,293,681, issued to Willis, discloses a rack designed to provide convenient storage of doors optionally removable from "JEEP-Style" SUV's. This allows a driver to operate the vehicle with the doors removed and thus frees up interior space. The rack is mounted on the rear of the vehicle exteriorly of the rear-mounted spare tire. Mounted securely in the rack, the doors are spaced from the spare tire and are prevented from rubbing each other and the spare tire. The doors are therefore protected from scratches and abrasions.

Willis does not disclose removal or storage of the SUV hardtop.

BRIEF SUMMARY OF THE INVENTION

A carrying system for a SUV hardtop, which includes a carrier that allows the hardtop and doors to be detached from the vehicle but still kept with the vehicle while removed, is disclosed herein. The carrying system allows for easy attachment and securing of the hardtop and doors to the carrier. In an exemplary embodiment, the carrier is secured to both the receiver of the frame-mounted trailer hitch and, also, to the rear-mounted spare tire carrier of the SUV. Carrying the doors and hardtop with the SUV allows the SUV, at any time and in any place, to be converted quickly between a state of having the top removed or reinstalled, at the user's discretion depending on weather conditions and other factors.

In some embodiments of the present general inventive concept, a carrying system for a SUV hardtop and doors includes a carrier with a frame, said frame supporting a plurality of braces and brackets to receive and support the hardtop and doors of the SUV, a first mounting assembly adapted to attach the carrier to the receiver of the frame-mounted trailer hitch on the SUV, and a second mounting assembly for securing the carrier to a rear-mounted spare tire carrier of the SUV.

BRIEF DESCRIPTION OF THE DRAWINGS

The following exemplary embodiments are representative of example techniques and structures designed to carry out the objects of the present general inventive concept, but the present general inventive concept is not limited to these exemplary embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the following exemplary embodiments, with reference to the accompanying drawings in which.

DETAILED DESCRIPTION OF THE INVENTION

Disclosed herein is a carrying system for stowing an SUV hardtop and/or doors while detached from the vehicle, which includes a carrier that allows the hardtop and doors to be detached from the vehicle but still kept with the vehicle while detached. The carrying system allows for easy attachment and securing of the hardtop and doors to the carrier. In an exemplary embodiments, the carrier is secured to both the receiver of the frame-mounted hitch and to the rear-mounted spare tire carrier of the SUV. This dual securing system allows the frame-mounted trailer hitch to bear the weight of the carrier, top, and doors, while simultaneous attachment to the rear-mounted spare tire stabilizes the carrier and substantially prevents sway. In other exemplary embodiments, the carrier attaches to the vehicle only at the hitch. Conveying the doors and hardtop with the SUV allows the SUV, at any time and in any place, to be converted quickly between convertible and non-convertible modes, depending on weather conditions and other factors.

Figure 1:
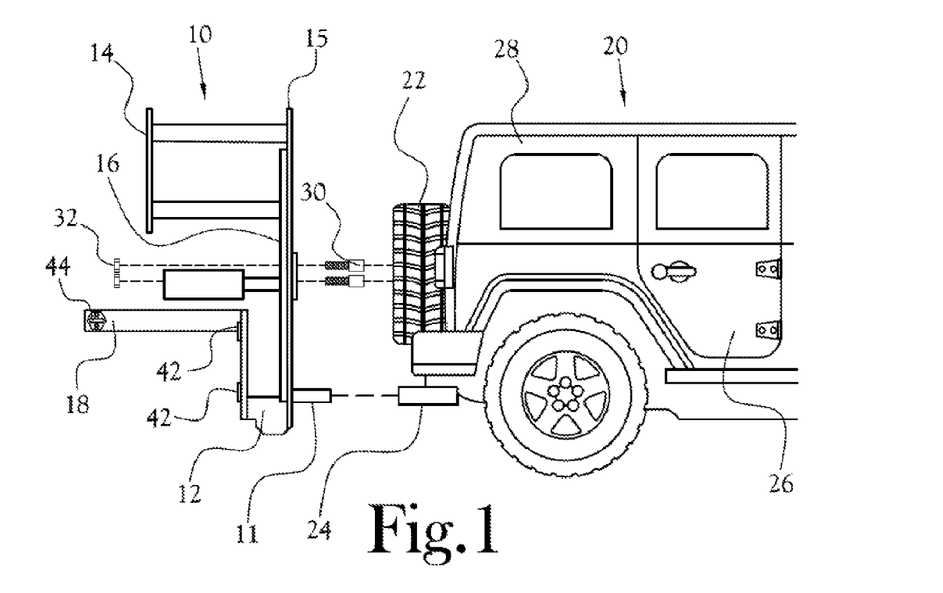
FIG. 1 is a side view of an exemplary embodiment of a carrying system for a SUV hardtop, showing the carrier before attachment to the back of the SUV and with the SUV hardtop still in place on the SUV.
Figure 5:
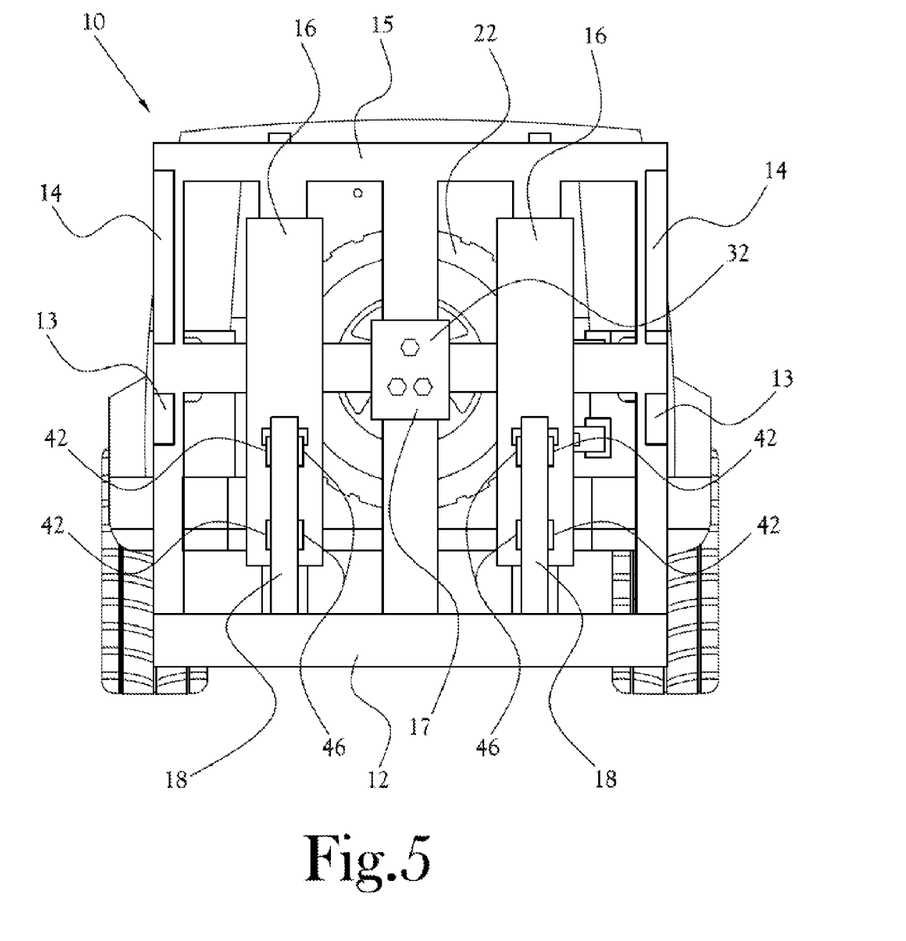
FIG. 5 is a view of the exemplary embodiment shown in FIGS. 1-4, looking head-on at the carrier and the back of the vehicle.

Turning to the figures, FIG. 1 illustrates an exemplary embodiment of a carrying system for a SUV hardtop. In the illustrated exemplary embodiment, the carrier 10 includes a main frame 15, to which are attached other components that extend away from the vehicle 20. The carrier 10 also includes at least a first mounting assembly and a second mounting assembly. In this regard, mounting member 11 is a selected length draw-bar which is received by the receiver 24 of the frame mounted trailer hitch of the SUV. Mounting member 11, in combination with the receiver 24 bears the weight of the carrier 10. Further, as shown in FIG. 1 and FIG. 5, the carrier 10 is also secured to the SUV 20 through a series of mounting adapters 30, the long shafts of which pass through a mounting plate 17 on the carrier main frame 15 and attach to the existing bolts coming through the spare tire 22 to connect with the spare tire carrier. In this regard, the mounting adapters 30 include a first end defining an internally threaded bore which threadably receives the existing bolts on the spare tire carrier and a second end defining a threaded bolt. The mounting adapters 30 and their nuts 32 secure the main frame 15 to the existing rear-mounted spare tire carrier apparatus. The multiple mounting adapters 30 stabilize the carrier 10 to substantially reduce sway and further secure the carrier 10 in a manner that substantially eliminates torsion of the carrier 10 about the longitudinal axis of the mounting member 11.

These other components of the carrier 10, attached to and extending from the main frame 15, include hardtop brackets 13 to hold the hardtop, wind guards 14 to protect the hardtop, and door mounting brackets 18 joined to the frame by a lower front edge support bracket 12. Generally, the door mounting brackets 18 include hinge brackets 42 to receive the hinges of the doors. It will be appreciated that for use in certain SUV's the hinge brackets are adapted for receiving the hinge pins mounted to the door of the SUV. Further, the door mounting brackets 18 include a latch striker 44 for engaging the door latches of the removed and stowed doors. These components help secure the door to the carrier 10. As shown in FIG. 5, some embodiments of the present general inventive concept include additional sets of hinge loops 46 and other components to receive up to four doors on the carrier 10, for use with four-door vehicles.

Also shown in the view in FIG. 5, in some exemplary embodiments the main frame 15 also includes padded rails 16 or other padding to protect the hardtop from jostling or bumping into the frame. In various embodiments, other components of the carrier are similarly padded, for similar purposes. For instance, in some embodiments, the lower front edge support bracket 12 is padded because part of the hardtop rests on the lower front edge support bracket 12.

Figure 2:
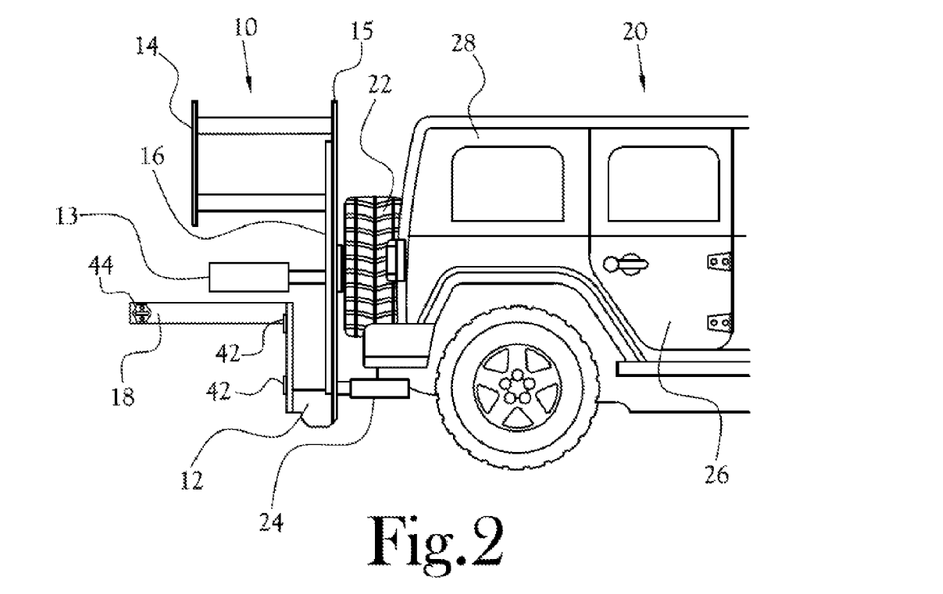
FIG. 2 is a second side view of the exemplary embodiment shown in FIG. 1, showing the carrier attached to the back of the SUV.
Figure 3:
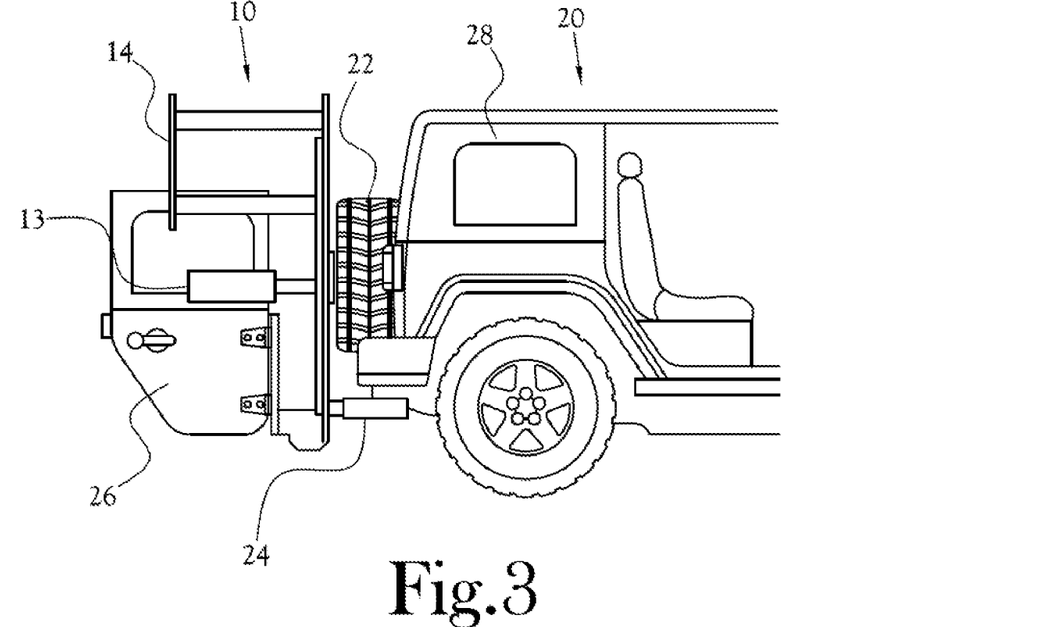
FIG. 3 is a third side view of the exemplary embodiment shown in FIG. 1, showing the doors of the SUV detached from the SUV and positioned on the carrier.
Figure 4:
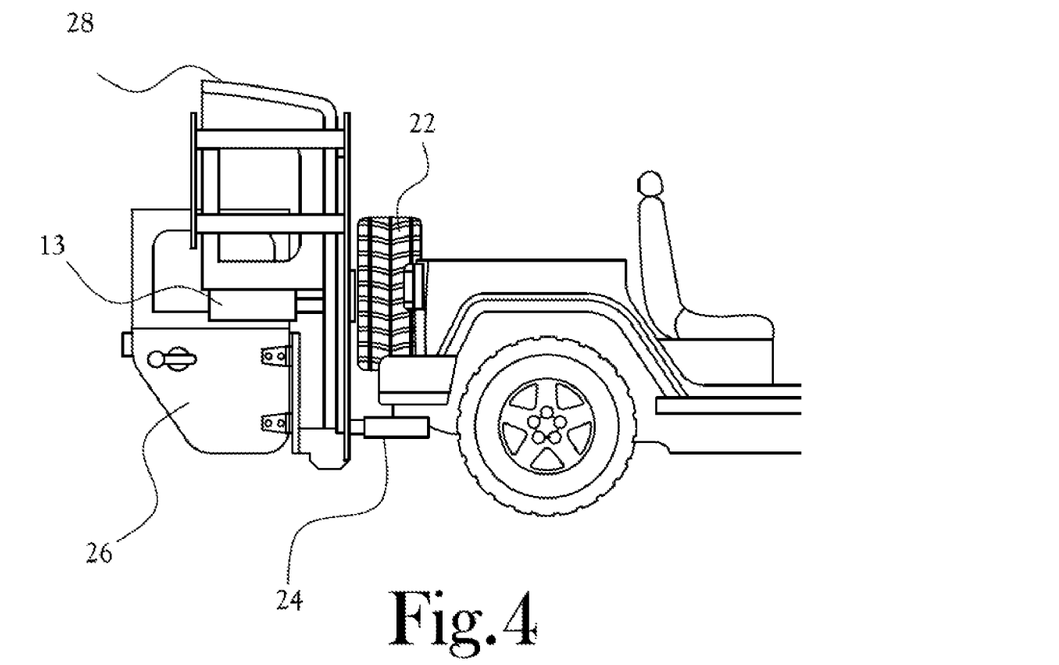
FIG. 4 is a fourth side view of the exemplary embodiment shown in FIG. 1, showing the doors and the hardtop positioned on the carrier.

FIG. 2 shows the carrier 10 attached to the back of the SUV 20, and FIGS. 3 and 4 illustrate how the doors and hardtop of the SUV 20 are loaded onto the carrier 10. As shown in FIG. 3, a side door 26 of the SUV 20 is detached from the SUV 20 and loaded onto the carrier 10 between one of the door mounting brackets 18. After all doors (generally two or four) are detached and loaded in this manner, the hardtop 28 is also detached from the SUV 20 and loaded onto the hardtop brackets 13 in the upper portion of the carrier 10, as shown in FIG. 4.

Figure 6:
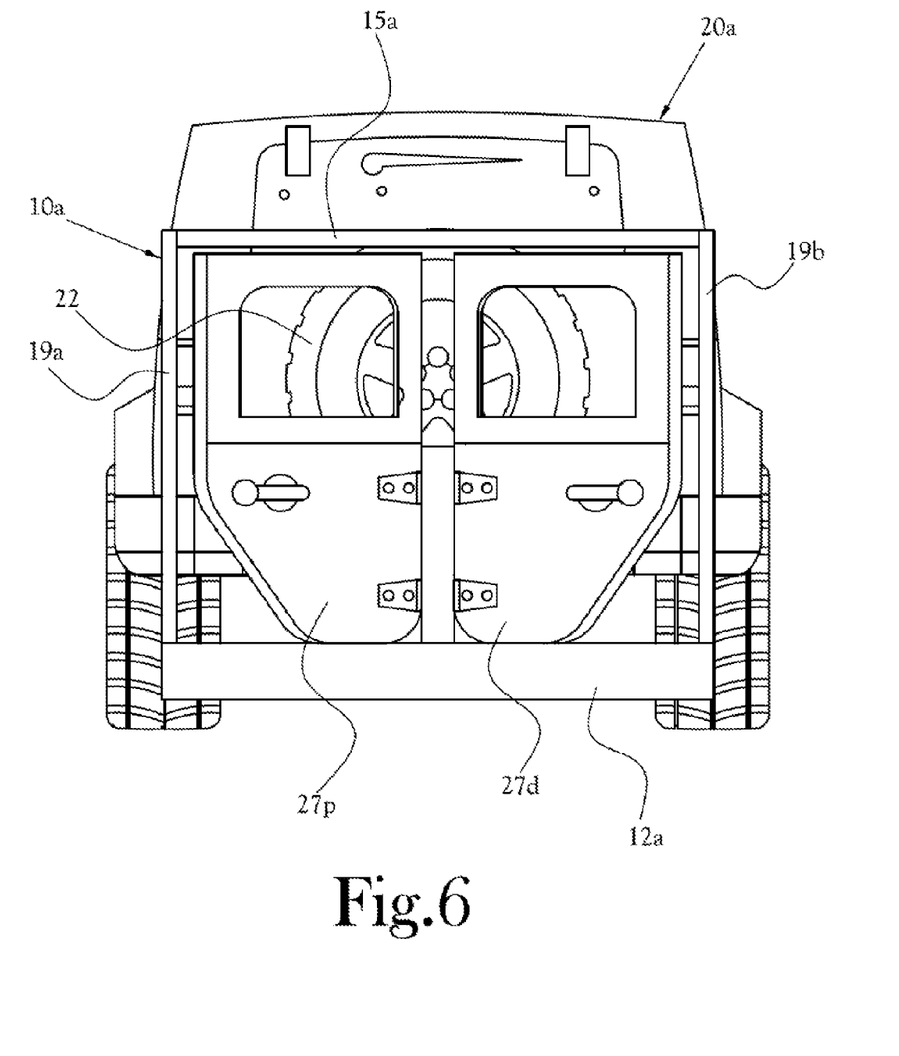
FIG. 6 is a side view of another exemplary embodiment of a carrying system for a SUV hardtop, showing an illustrative exemplary embodiment of a carrier adapted to hold two doors.
Figure 7:
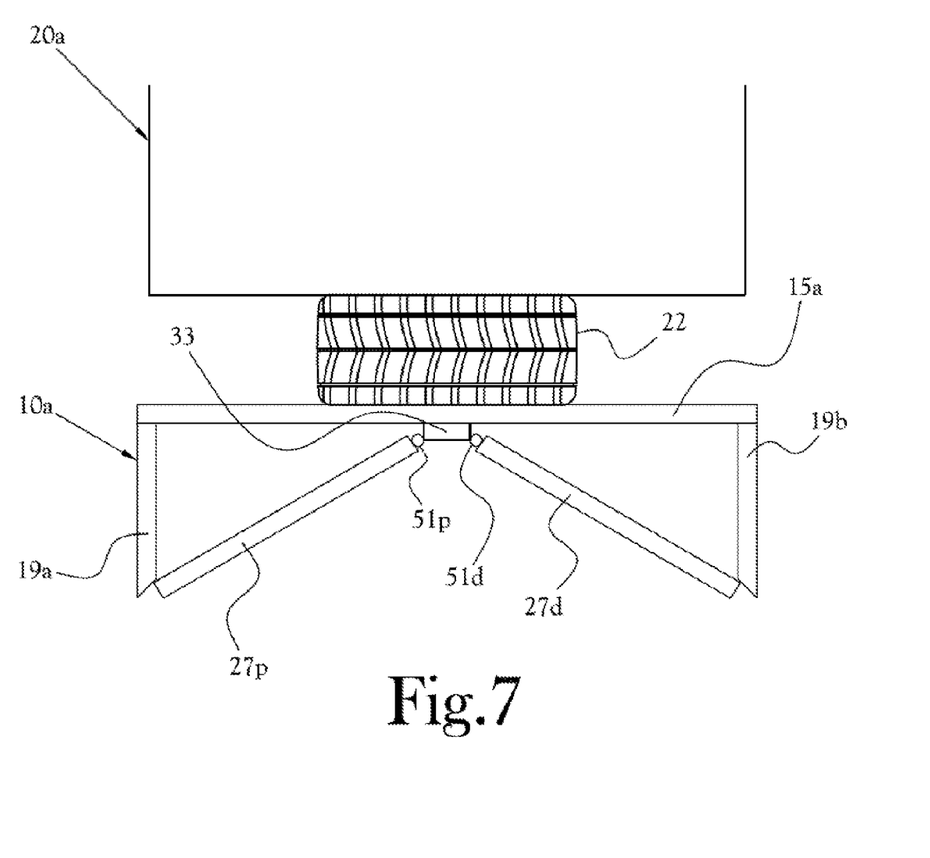
FIG. 7 is a top-down view of the exemplary embodiment shown in FIG. 6.

FIGS. 6 and 7 illustrate another exemplary embodiment of the present general inventive concept, in which a two-door carrier 10a is attached to the back of a SUV 20a. The two-door carrier 10a includes a back frame 15a and side-frame members 19a and 19b, as well as a central frame member 33. The two-door carrier 10a includes holds two removed vehicle doors, the passenger-side door 27p and the driver-side door 27d. As shown in FIG. 7, the central frame member 33 includes hinge loops 51p and 51d to receive the hinges of the doors; generally, side-frame members 19a and 19b, include additional latch strikers (not shown) that receive and engage the latches of the vehicle doors 27p and 27d; these components help secure the doors 27p and 27d to the two-door carrier 10a.

Figure 8A:
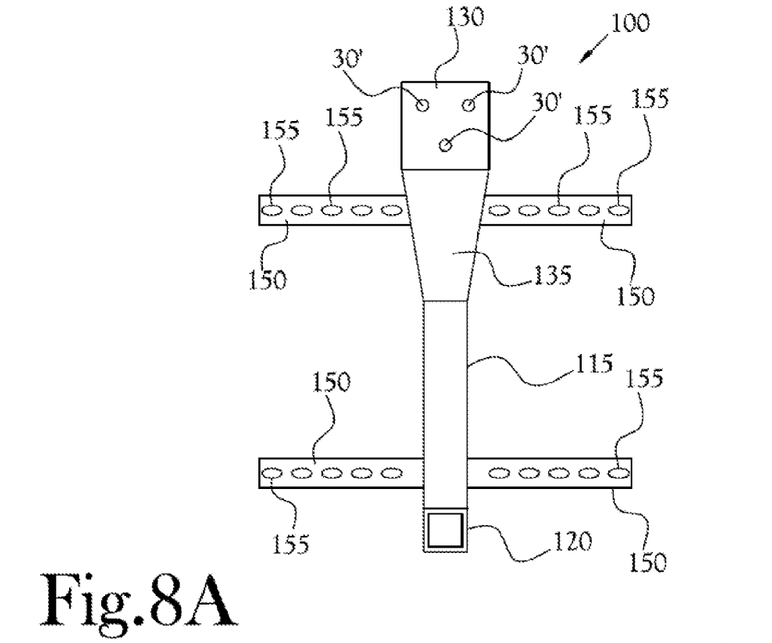
FIGS. 8A and 8B are a front view and side view, respectively, of a mounting bracket for removably mounting the carrier system of the present invention to a wall structure.
Figure 8B:
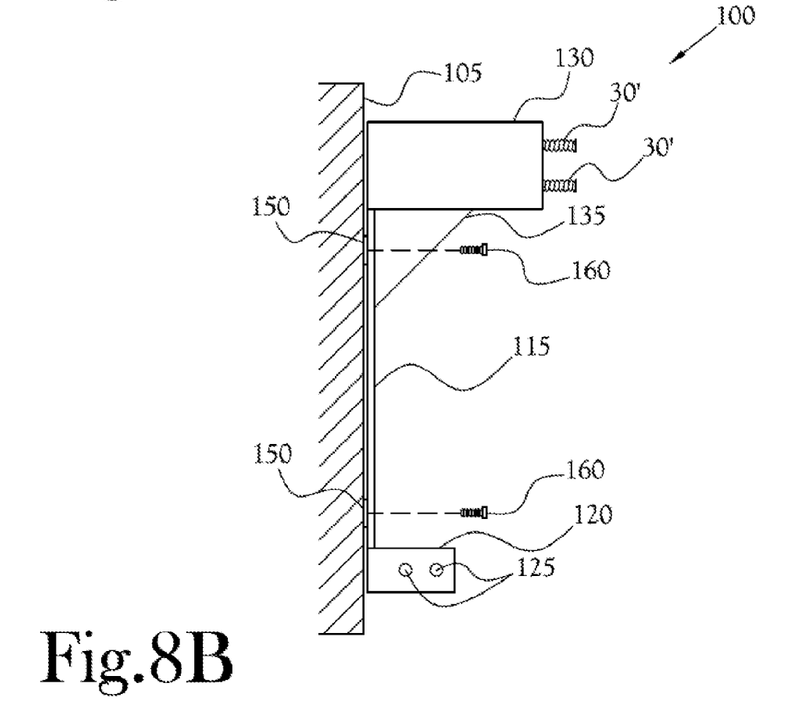

Referring to FIGS. 8A and 8B, it will be appreciated by those skilled in the art that certain users of SUV's of the type having removable tops and doors, may wish to stow the removed top and doors in the user's garage. Accordingly, an exemplary embodiment of the present invention provides for a mounting bracket 100 adapted to be secured to a wall structure 105. Mounting bracket 100 includes a frame 115 which supports the mounting points described below. The mounting points of the mounting bracket 100 mimic, as it were, or are analogous to, the spare tire mount and the receiver described above. In this regard, an upper mounting bracket 130 is carried by the upper end of the frame 115. The upper mounting bracket 130 extends outwardly from frame 115, as best illustrated in FIG. 8B and is supported by support member 135. Further, a receiver 120 depends from the lower end of the frame 115. Receiver 120 receives mounting member 11. The frame 115 is carried by at least two wall-mounting brackets 150 which secure the frame 115 to a wall structure 105. Further, each wall-mounting bracket 150 is provided with a plurality of mounting bores 155 which receive lag bolts 160, or similar bolts, for securing mounting bracket 100 to the wall structure 105.

In some embodiments of the present general inventive concept, the carrier totally or partially covers the taillights of the vehicle, and therefore the carrier itself includes taillights that substitute for (or supplement) the taillights of the vehicle.

Some exemplary embodiments of the present general inventive concept include a stabilizer brace on the hitch to prevent or inhibit excessive swaying.

Some exemplary embodiments of the present general inventive concept include a ratchet strap to further secure the doors and/or the hardtop to the carrier, to keep those parts or the carrier itself from excessive swaying. Likewise, some exemplary embodiments include safety chains.

A carrying system according to the present general inventive concept provides an apparatus and means to transport doors and hardtop for a SUV while also allowing for simultaneous utilization of the open-air, convertible-style mode of driving that is one of the principal benefits of a SUV or other convertible-style automotive vehicle. Transporting the doors and hardtop with the SUV allows the user/driver of the SUV, even on the road and far from home, to reinstall the doors and top depending on weather conditions, the preferences of the vehicle occupants, and other factors.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A carrying system defining a carrier for an SUV having a removable hardtop, removable doors, a receiver for a frame-mounted trailer hitch, and an externally mounted spare tire carrier, said carrying system for stowing a SUV hardtop and doors, said carrying system comprising:
   a frame member having a first mounting member adapted to be received by the receiver of the frame-mounted trailer hitch thereby supporting said carrier and a second mounting member adapted to be secured to the externally mounted spare tire carrier, whereby simultaneous securement of said first mounting member to the receiver and of said second mounting member to the externally mounted spare tire carrier co-act to stabilize said carrier so as to substantially reduce sway and substantially eliminate torsion of said carrier about a longitudinal axis of said first mounting member;
   a door support bracket assembly carried by said frame member, said door support bracket assembly being adapted to receive and secure at least a pair of doors removed from the SUV, wherein said door support bracket assembly further comprises at least one hinge bracket adapted for receiving a hinge of the removable door, and further comprises at least one latch striker for engaging a latch disposed on said removable door whereby upon engagement of said hinge bracket with said hinge and engagement of said latch striker with said latch secures the removable door to said door support bracket;
   a top support bracket carried by said frame member, said top support bracket being adapted to receive the removable hardtop of the SUV when removed from the SUV; and
   at least one wind guard for protecting a stowed hardtop while the SUV is in motion.

2. The carrying system of claim 1 wherein said second mounting member adapted to be secured to the externally mounted spare tire carrier includes at least one bolt defining a mounting adapter, said mounting adapter including a first end defining an internally threaded bore adapted to threadably receive an existing bolt on the spare tire carrier and a second end defining a threaded bolt.

3. The carrying system of claim 2 wherein said second mounting member adapted to be secured to the externally mounted spare tire carrier includes a plurality of said bolts defining a mounting adapter.

4. The carrying system of claim 1 wherein said hinge of the removable door is defined by a hinge pin.

5. A carrying system defining a carrier for an SUV having a removable hardtop, removable doors, a receiver for a frame-mounted trailer hitch, and an externally mounted spare tire carrier, said carrying system for stowing a SUV hardtop and doors, said carrying system comprising:
   a frame member having a first mounting member adapted to be received by the receiver of the frame-mounted trailer hitch thereby supporting said carrier and a second mounting member adapted to be secured to the externally mounted spare tire carrier, whereby simultaneous securement of said first mounting member to the receiver and of said second mounting member to the externally mounted spare tire carrier co-act to stabilize said carrier so as to substantially reduce sway and substantially eliminate torsion of said carrier about a longitudinal axis of said first mounting member, wherein said second mounting member includes at least one bolt defining a mounting adapter, said mounting adapter including a first end defining an internally threaded bore adapted to threadably receive an existing bolt on the spare tire carrier and a second end defining a threaded bolt;
   a door support bracket assembly carried by said frame member, said door support bracket assembly being adapted to receive and secure at least a pair of doors removed from the SUV, wherein said door support bracket assembly further comprises at least one hinge bracket adapted for receiving a hinge pin of the removable door and further comprises at least one latch striker for engaging a latch disposed on said removable door whereby upon engagement of said hinge bracket with said hinge and engagement of said latch striker with said latch secures the removable door to said door support bracket;
   a top support bracket carried by said frame member, said top support bracket being adapted to receive the removable hardtop of the SUV when removed from the SUV; and
   at least one wind guard for protecting a stowed hardtop while the SUV is in motion.

6. The carrying system of claim 5 wherein said second mounting member adapted to be secured to the externally mounted spare tire carrier includes a plurality of said bolts defining a mounting adapter.

7. A carrying system defining a carrier for an SUV having a removable hardtop, removable doors, a receiver for a frame-mounted trailer hitch, and an externally mounted spare tire carrier, said carrying system for stowing a SUV hardtop and doors, said carrying system comprising:
   a frame member having a first mounting member adapted to be received by the receiver of the frame-mounted trailer hitch thereby supporting said carrier and a second mounting member adapted to be secured to the externally mounted spare tire carrier, whereby simultaneous securement of said first mounting member to the receiver and of said second mounting member to the externally mounted spare tire carrier co-act to stabilize said carrier so as to substantially reduce sway and substantially eliminate torsion of said carrier about a longitudinal axis of said first mounting member;
   a door support bracket assembly carried by said frame member, said door support bracket assembly being adapted to receive and secure at least a pair of doors removed from the SUV, wherein said door bracket assembly further comprises at least one hinge bracket adapted for receiving a hinge of the removable door, and further comprises at least one latch striker for engaging a latch disposed on said removable door whereby upon engagement of said hinge bracket with said hinge and engagement of said latch striker with said latch secures the removable door to said door support bracket;
   a top support bracket carried by said frame member, said top support bracket being adapted to receive the removable hardtop of the SUV when removed from the SUV; and
   at least one wind guard for protecting a stowed hardtop while the SUV is in motion.

8. The carrying system of claim 7 wherein said second mounting member adapted to be secured to the externally mounted spare tire carrier includes at least one bolt defining a mounting adapter, said mounting adapter including a first end defining an internally threaded bore adapted to threadably receive an existing bolt on the spare tire carrier and a second end defining a threaded bolt.

9. The carrying system of claim 8 wherein said second mounting member adapted to be secured to the externally mounted spare tire carrier includes a plurality of said bolts defining a mounting adapter.

10. The carrying system of claim 8 wherein said hinge of the removable door is defined by a hinge pin.

\* \* \* \* \*